Patented Oct. 16, 1928.

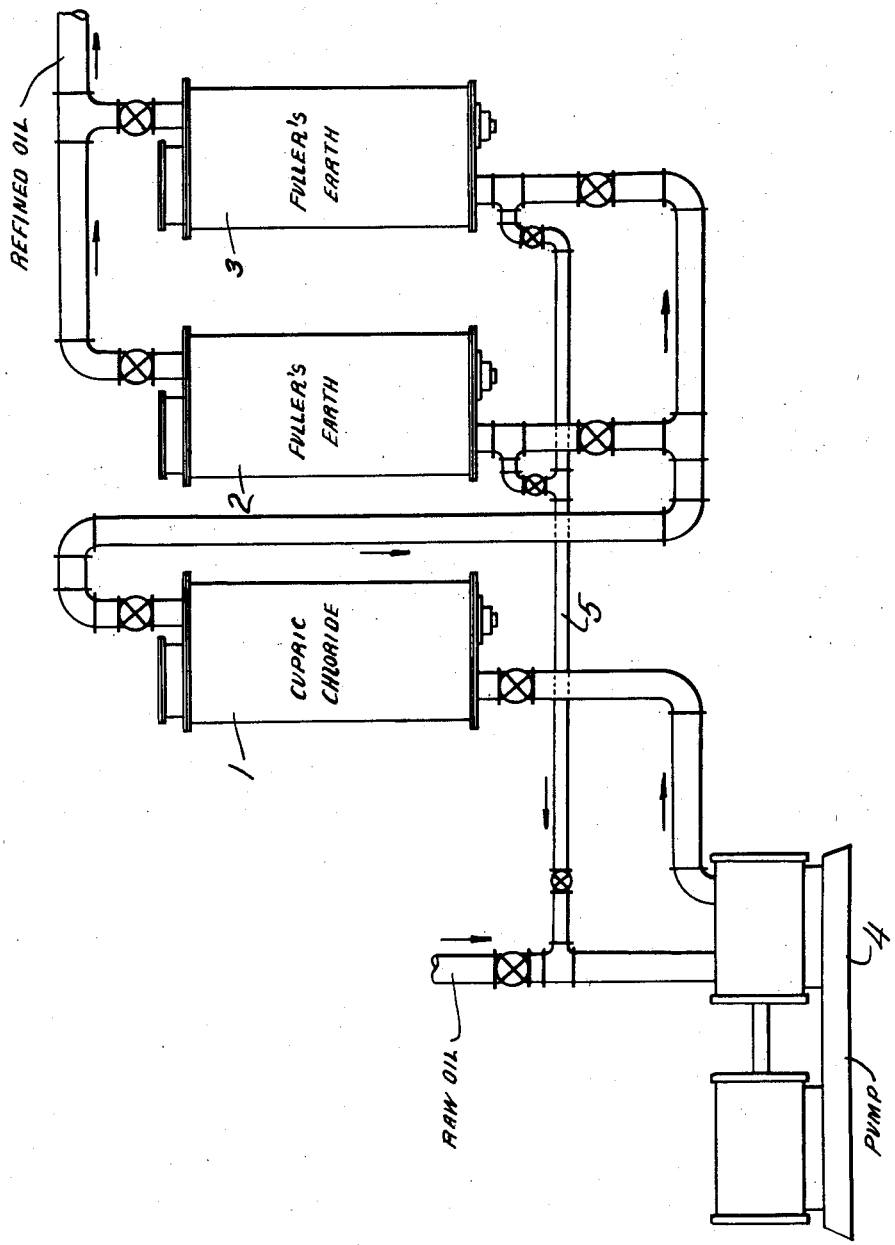

1,687,992

UNITED STATES PATENT OFFICE.

ERNEST B. PHILLIPS, OF EAST CHICAGO, AND JAMES G. STAFFORD, OF HAMMOND, INDIANA, ASSIGNORS, BY MESNE ASSIGNMENTS, TO THE GRAY PROCESSES CORPORATION, OF NEWARK, NEW JERSEY, A CORPORATION OF DELAWARE.

REFINING OF HYDROCARBON OILS.

Application filed May 29, 1926. Serial No. 112,638.

This invention relates to improvements in refining petroleum distillates. The invention is of special value and application in the treatment of light petroleum distillates, for example, gasoline, used for motor fuel. The invention is also useful in the treatment of other petroleum distillates, including petroleum solvent naphthas, petroleum cleaners naphthas, petroleum varnish thinners, and the like.

Unrefined petroleum distillates usually contain constituents, commonly called "sour" elements, which give the oil undesirable color, and render it corrosive and unstable particularly when exposed to sunlight. Several methods have been used for the removal of such "sour" constituents, for example the so-called "doctor" treatment with an alkali plumbite, but none of them has been completely satisfactory in all cases. Sometimes the "sour" elements seem to be particularly refractory under treatment and in other cases the treatment seems to result in the introduction into the oil of undesirable constituents as bad as those originally present. Some methods have also involved undesirable losses, and almost without exception rather close control of the operation has been necessary. This invention relates particularly to improvements in methods of refining such oils for the removal of such "sour" constituents.

According to the present invention, the petroleum distillate, while substantially free from water, is subjected to treatment with solid cupric chloride and then to treatment with fuller's earth. In place of fuller's earth, similar solid adsorbent materials such as other absorbent clays are useful in carrying out the invention. Cupric chloride is particularly advantageous because of its relatively high activity.

The refining process of the invention is advantageously carried out in a continuous manner by flowing a stream of the petroleum distillate to be treated first through a body of finely divided solid cupric chloride and then through one or more bodies of finely divided solid adsorbent material. The cupric chloride treatment may be carried out in other ways, however, for example an amount of finely divided solid cupric chloride sufficient to react with the "sour" constituents present may be agitated with the oil and separated prior to treatment of the oil with a solid adsorbent by filtration, or a small amount of the finely divided solid cupric chloride may be agitated with the oil and any excess of the cupric chloride removed during treatment with the solid adsorbent material, for example by filtering the oil with any excess cupric chloride through a body of the solid adsorbent material. The treatment of the oil with the solid adsorbent material may also be carried out in a number of ways, for example, following treatment with cupric chloride the oil may be filtered or percolated through a body of the adsorbent material or the adsorbent material in a finely divided state may be agitated with the oil and subsequently separated by filtration or settling.

During treatment with cupric chloride, "sour" elements present in the petroleum distillates are apparently converted into an inactive form but the reaction products, or at least a part of the reaction products, remain in the oil. Following adequate treatment with cupric chloride, for example, petroleum distillates that preceding treatment become colored when treated with alkali plumbite usually fail to respond to this test even in the presence of an excess of elementary sulphur. Reaction products remaining in the oil, however, are of such a character that they are effectively removed by treatment with solid adsorbent materials such as fuller's earth. The process of the invention thus comprises essentially two steps, a "fixing" of undesirable components of the oil such as so-called "sour" constituents and the removal from the oil of such "fixed" constituents.

The invention will be further described in connection with the accompanying drawings which illustrate one form of apparatus adapted for carrying out the process of the invention. It will be understood that this more detailed description of the invention is intended as an exemplification of the invention and that the invention is not limited thereto.

Referring to the drawings, the apparatus illustrated comprises three treating cells, 1, 2 and 3 each of these being provided with appropriate ports for supplying and discharging finely divided solid material and with suitable screens to prevent the escape of such solid material from the cells. The raw petroleum distillate, substantially free from water, is forced by pump 4 as a continuous stream first through cell 1 and then alternately through cells 2 and 3. Cell 1 is filled with crystalline cupric chloride and cells 2 and 3 with fuller's earth. Duplicate fuller's earth cells are provided to permit the discharging and recharging of one while the oil under treatment is flowing through the other. A connection 5 is provided for returning to the suction side of the pump 4 oil remaining in the cells 2 and 3 when they are open for replacement of the charge of adsorbent material. The rate of flow of oil is regulated so that the period of time over which the oil is in contact with cupric chloride in passing through cell 1 is sufficient to convert into inactive form the "sour" constituents present in the particular oil under treatment. During upward travel through the fuller's earth in cell 2 or cell 3 the reaction products of the cupric chloride treatment are adsorbed by the earth and thus removed from the petroleum distillate. It will be apparent that the oil might be passed through a series of cells charged with adsorbent material, and as the charge in one or more of the cells became exhausted that other charges in the series might be advanced so that the oil as discharged from the apparatus is always last contacted with the freshest charge of adsorbent material. Following the treatment with fuller's earth, the oil may be run to storage or otherwise disposed of as desired.

Before the adsorbent material in cell 2 or 3 loses its capacity to remove the reaction products of the cupric chloride treatment, the cell containing the exhausted charge of adsorbent material is cut out while the operation is continued in the other cell, the exhausted charge removed and replaced with a fresh charge, the recharged cell then being put back in service while the other cell is discharged and recharged. If desired, the exhausted adsorbent material may be subjected to suitable treatment for recovery of copper present in adsorbed constituents.

In general, an average consumption of the refining agents in the treatment of motor fuel gasoline is something less than 1 pound of cupric chloride and something less than 60 pounds of fuller's earth per 120 barrels of petroleum distillate treated, but it will be understood that the consumption of the refining agents varies in accordance with the character and amount of "sour" constituents present in the raw oil subjected to treatment. It will also be understood that control of the operation involves simply the maintenance of contact between the oil and the refining agents employed for a period of time sufficient to effect the removal of the desired constituents to the extent necessary in any particular case.

Due to the simplicity of operation and to the fact that the process of the invention is well adapted to continuous operation, the invention is of special advantage in the treatment of natural gas gasoline or casinghead gas gasoline where it is frequently desirable to treat the oil in a continuous manner even though the hourly amount of oil to be treated is relatively small.

The invention has several important advantages. In operation and control, it is extremely simple. Except as to constituents the removal of which is desired, the oil is substantially unaffected, and the operation does not involve loss of constituents suitable as components of the desired product. "Sour" constituents are converted into an inactive form, and the invention provides for the effective removal of "sour" constituents and reaction products of the treatment. Likewise, the treated oil is substantially free from constituents introduced by the refining operation. And, in many instances, the product can be improved particularly as to color and corrosion and as to stability on exposure to sunlight and freedom from "sourness."

We claim:

1. An improved method of removing sour constituents from petroleum distillates, comprising subjecting the liquid oil while substantially free from water to treatment with solid cupric chloride and thereafter removing from the oil reaction products of the cupric chloride treatment by subjecting the oil to treatment with fuller's earth.

2. An improved method of removing sour constituents from petroleum distillates, comprising subjecting the liquid oil while substantially free from water to treatment with solid cupric chloride and thereafter removing from the oil reaction products of the cupric chloride treatment by subjecting the oil to treatment with a solid adsorbent.

3. An improved method of removing sour constituents from petroleum distillates, comprising continuously flowing a liquid stream of the oil substantially free from water first through a body of finely divided solid cupric chloride and then through a body of finely divided fuller's earth.

4. An improved method of removing sour constituents from gasoline which comprises contacting the gasoline with solid cupric chloride and subsequently contacting the gasoline with a solid adsorbent.

ERNEST B. PHILLIPS.
JAMES G. STAFFORD.